UNITED STATES PATENT OFFICE.

PAUL J. FOX, OF WASHINGTON, DISTRICT OF COLUMBIA.

PROCESS FOR EXTRACTING POTASH AND ALUMINA FROM ALUNITE.

1,217,432.  Specification of Letters Patent.  Patented Feb. 27, 1917.

No Drawing.  Application filed May 5, 1916. Serial No. 95,575.

(DEDICATED TO THE PUBLIC.)

*To all whom it may concern:*

Be it known that I, PAUL J. FOX, a citizen of the United States of America, and an employee of the Department of Agriculture of the said United States, residing at the city of Washington, District of Columbia, (whose post-office address is Washington, District of Columbia,) have invented a new and useful Process for Extracting Potash and Alumina from Alunite.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a process for the treatment of the mineral alunite for the recovery of potash and alumina.

It is known that when alunite alone is heated below or at redness, fumes of sulfuric trioxid are given off and the alumina is left in the form of aluminum oxid. This sulfur trioxid is the well known anhydrid of sulfuric acid, and in the presence of fluorspar, calcium fluorid, or other compound of fluorin, may be utilized to generate hydrofluoric acid. The hydrofluoric acid so generated converts aluminum oxid into aluminum fluorid, the aluminum fluorid being the form in which aluminum is electrolyzed by standard processes to recover the metallic aluminum. At the same time the potassium is left as sulfate and may be leached from the heated product.

In practising my process, I first mix the alunite with fluorspar or other compound of fluorin, and then heat the mixture at or below redness. From experiments I have ascertained that the best way to effect a proper mixture is by grinding the alunite and fluorspar together. Generally speaking, three chemical equivalents of fluorspar to each chemical equivalent of aluminum oxid should be used, but I do not confine myself to these proportions, as good results may be obtained with varying mixtures. In case sodium fluorid is used instead of calcium fluorid, about six chemical equivalents should be used for each chemical equivalent of alumina. The intimately mixed and finely powdered mixture is then heated below redness at such a temperature and for such a time as to insure the conversion of all, or substantially all, of the alumina into aluminum fluorid. The resultant mass is allowed to cool and the potassium sulfate dissolved or leached out with water. The potassium sulfate or other soluble potash salts dissolve out and the aluminum fluorid remains in the insoluble residue. The soluble potash salts are recovered from the water solution by evaporation or other well known means. The aluminum is recovered from the insoluble residue by electrolysis after adding, if necessary, sodium carbonate, sodium fluorid, borax or other reagent for making the material more fusible.

The reactions may be represented as proceeding substantially as follows:

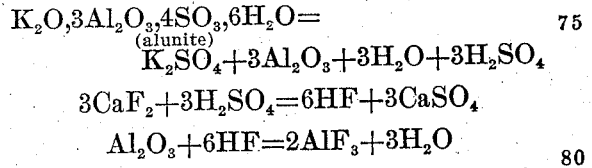

$$K_2O,3Al_2O_3,4SO_3,6H_2O \text{ (alunite)} =$$
$$K_2SO_4 + 3Al_2O_3 + 3H_2O + 3H_2SO_4$$
$$3CaF_2 + 3H_2SO_4 = 6HF + 3CaSO_4$$
$$Al_2O_3 + 6HF = 2AlF_3 + 3H_2O$$

The terms potash and alumina as used in the claims, are intended to include any compound of potassium or aluminum that may result from the reactions above described.

Having thus described my invention, I claim:

1. A process for the extraction of potash and alumina from alunite, consisting in mixing alunite and a fluorid, subjecting the mixture to heat, leaching out the potash from the resulting mass with water and treating and electrolyzing the residue for the recovery of aluminum, substantially as described.

2. A process for the extraction of potash and alumina from alunite, consisting in mixing alunite and a fluorid together by grinding said materials until they are reduced to finely powdered form, subjecting the finely ground mixture to heat until the aluminum contained therein is converted into aluminum fluorid, leaching out the potash contained in the resulting mass with water, and treating the residue with the aid of fluxing agents and electrolysis for the recovery of the aluminum, substantially as described.

In testimony whereof, I affix my signature in the presence of two subscribing witnesses.

PAUL J. FOX.

Witnesses:
J. B. HORIGAN,
C. W. BOYLE.